United States Patent
Kotnis et al.

(10) Patent No.: US 12,353,416 B2
(45) Date of Patent: *Jul. 8, 2025

(54) ANSWERING COMPLEX QUERIES IN KNOWLEDGE GRAPHS WITH BIDIRECTIONAL SEQUENCE ENCODERS USEABLE TO SUPPORT DECISION MAKING AND HAVING MEDICAL USE APPLICATIONS

(71) Applicant: NEC Corporation, Tokyo (JP)

(72) Inventors: Bhushan Kotnis, Heidelberg (DE); Mathias Niepert, Heidelberg (DE); Carolin Lawrence, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 41 days.

This patent is subject to a terminal disclaimer.

(21) Appl. No.: 18/355,432

(22) Filed: Jul. 20, 2023

(65) Prior Publication Data

US 2023/0359629 A1 Nov. 9, 2023

Related U.S. Application Data

(63) Continuation of application No. 16/857,194, filed on Apr. 24, 2020, now Pat. No. 11,748,356.

(30) Foreign Application Priority Data

Dec. 6, 2019 (EP) .................................. 19214254

(51) Int. Cl.
 *G06F 16/2455* (2019.01)
 *G06F 16/22* (2019.01)
 (Continued)

(52) U.S. Cl.
 CPC .... *G06F 16/24553* (2019.01); *G06F 16/2246* (2019.01); *G06F 16/322* (2019.01); *G06F 16/9024* (2019.01)

(58) Field of Classification Search
 None
 See application file for complete search history.

(56) References Cited

U.S. PATENT DOCUMENTS

| 8,504,361 B2 | 8/2013 | Collobert et al. |
| 2007/0208693 A1 | 9/2007 | Chang et al. |

(Continued)

FOREIGN PATENT DOCUMENTS

CN 110516055 A 11/2019

OTHER PUBLICATIONS

Hamilton, William L et al. "Embedding Logical Queries on Knowledge Graphs," 32nd Conference on Neural Information Processing Systems (NeurIPS 2018), Montréal, Canada, Dec. 2-8, 2018.

(Continued)

*Primary Examiner* — Giuseppi Giuliani
(74) *Attorney, Agent, or Firm* — Leydig, Voit & Mayer, Ltd.

(57) ABSTRACT

A method for encoding a query graph into a sequence representation includes receiving m×n path queries representing a query graph having m root nodes and n leaf nodes, each path query beginning with a root node and ending with a leaf node, and encoding positions of each node and each edge between nodes within each path query independently, wherein the encoded positions include a positional order within each path query. The positional encodings may include no positional ordering between different path queries. The query graph may include one or more missing entities and each missing entity may be masked to produce a masked sequential query, which may be fed to a transformer encoder. The invention can be used for, but is not limited to, medical uses, such as for predicting protein-drug interactions or medical conditions, as well as other applications, and significantly outperforms the optimized model.

20 Claims, 6 Drawing Sheets

(51) Int. Cl.
    *G06F 16/31*     (2019.01)
    *G06F 16/901*     (2019.01)

(56) References Cited

U.S. PATENT DOCUMENTS

| | | | |
|---|---|---|---|
| 2019/0251168 | A1 | 8/2019 | McCann et al. |
| 2019/0251461 | A1 | 8/2019 | Douglas et al. |
| 2019/0354567 | A1 | 11/2019 | Dehghani et al. |
| 2019/0362246 | A1* | 11/2019 | Lin .................... G06F 16/9024 |
| 2019/0370389 | A1 | 12/2019 | Blouw et al. |
| 2020/0202194 | A1* | 6/2020 | Wu ........................ G06F 40/35 |
| 2020/0410337 | A1 | 12/2020 | Huang et al. |
| 2021/0049458 | A1 | 2/2021 | Chang et al. |
| 2021/0165960 | A1 | 6/2021 | Eisenschlos et al. |

OTHER PUBLICATIONS

Guu, Kelvin et al. "Traversing Knowledge Graphs in Vector Space," arXiv:1506.01094v2, Aug. 19, 2015.

Wang, Quan et al. "CoKE: Contextualized Knowledge Graph Embedding," arXiv:1911.02168v1, Nov. 6, 2019.

Luo, Kangqi et al. "Knowledge Base Question Answering via Encoding of Complex Query Graphs," Association for Computational Linguistics, Proceedings of the 2018 Conference on Empirical Methods in Natural Language Processing, pp. 2185-2194, Brussels, Belgium, Oct. 31-Nov. 4, 2018.

Shen, Tao et al. "Bi-Directional Block Self-Attention for Fast and Memory-Efficient Sequence Modeling," ICLR 2018, Apr. 30-May 3, 2018.

Ghelani, Shreya, "Breaking BERT Down: A complete breakdown of the latest milestone in NLP," Medium, https://towardsdatascience.com/breaking-bert-down-430461f60efb, Jul. 26, 2019.

Mack, David, "Answering English questions using knowledge graphs and sequence translation," Medium, https://medium.com/octavian-ai/answering-english-questions-using-knowledge-graphs-and-sequence-translation-2acbaa35a21d, Jul. 4, 2018.

Maheshwari, Guarav et al. "Learning to Rank Query Graphs for Complex Question Answering over Knowledge Graphs," Nov. 2018.

Liang, Di et al. "Adaptive Multi-Attention Network Incorporating Answer Information for Duplicate Question Detection," Association for Computing Machinery, SIGIR '19, Jul. 21-25, 2019, Paris, France.

Lu, Xiaolu et al. "Answering Complex Questions by Joining Multi-Document Evidence with Quasi Knowledge Graphs," arXiv:1908.00469v2, Aug. 8, 2019.

Nathani, Deepak et al. "Learning Attention-based Embeddings for Relation Prediction in Knowledge Graphs," arXiv:1906.01195v1, Jun. 4, 2019.

Devlin, Jacob et al. "BERT: Pre-training of Deep Bidirectional Transformers for Language Understanding," arXiv:1810.04805v2, May 24, 2019.

\* cited by examiner

|  | CQE-TransE | | CQE-DistMult | | CQE-Bilinear | | BiQE | | Data pts |
|---|---|---|---|---|---|---|---|---|---|
|  | MRR | HITS10 | MRR | HITS10 | MRR | HITS10 | MRR | HITS10 | |
| Hop 1 | 0.338 | 0.61 | .409 | 0.22 | 0.249 | 0.398 | 0.514 | 0.944 | 1000 |
| Hop 2 | 0.380 | 0.541 | 0.430 | 0.63 | 0.284 | 0.464 | 0.816 | 0.893 | 1000 |
| Hop 3 | 0.427 | 0.603 | 0.477 | 0.646 | 0.426 | 0.605 | 0.834 | 0.878 | 606 |
| Hop 4 | 0.413 | 0.601 | 0.499 | 0.624 | 0.508 | 0.651 | 0.888 | 0.926 | 477 |
| Hop 5 | 0.460 | 0.580 | 0.499 | 0.6 | 0.554 | 0.747 | 0.887 | 0.937 | 285 |
| Hop 6 | 0.490 | 0.543 | 0.457 | 0.669 | 0.687 | 0.811 | 0.925 | 0.937 | 127 |
| Micro Avg. | 0.377 | 0.581 | 0.453 | 0.656 | 0.374 | 0.554 | 0.866 | 0.919 | |

Table 1: Comparison of BiQE with CQE on the FB15K-237 Path dataset.

|  | AUC | APR |
|---|---|---|
| CQE-Bilinear | 91 | 91.5 |
| CQE-DistMult | 90.7 | 91.3 |
| CQE-TransE | 88.7 | 89.9 |
| BiQE | 96.91 | 96.69 |

Table 2: Comparison of BiQE with CQE on the Bio dataset.

FIG. 3

ANSWERING COMPLEX QUERIES IN KNOWLEDGE GRAPHS WITH BIDIRECTIONAL SEQUENCE ENCODERS USEABLE TO SUPPORT DECISION MAKING AND HAVING MEDICAL USE APPLICATIONS

CROSS-REFERENCES TO RELATED APPLICATIONS

The present application is a continuation application of U.S. application Ser. No. 16/857,194, filed on Apr. 24, 2020, which claims priority to EP Application No. EP19214254.5, filed Dec. 6, 2019, both of which are entitled "ANSWERING COMPLEX QUERIES IN KNOWLEDGE GRAPHS WITH BIDIRECTIONAL SEQUENCE ENCODERS," and both of which are hereby incorporated by reference.

FIELD

Embodiments relate to methods and systems for answering complex queries, and in particular methods and systems for answering complex queries in knowledge graphs using bidirectional sequence encoders.

BACKGROUND

Knowledge graphs are an important formalism to represent structured data and are widely used in numerous application domains. Examples of such applications are financial fraud detection in a knowledge graph that represents car accidents and the discovery of side effects between drugs in a knowledge graph representing proteins, drugs, and side effects. Existing AI methods have focused on answering (predicting) the existence of missing links in the graph, for example, predicting a side-effect link between two drugs. However, numerous real-world applications require the ability to answer (predict the answers) of more complex queries. For instance, one could ask for all pairs of drugs (a, b) and a protein p1 such that there exists some protein p such that a targets p, b targets p1 and p1 interacts in some way with p. This example query is an instance of what may be called a "complex query".

A benefit of knowledge graphs is their support of a wide variety of logical queries. Prior work has answered simple path queries by composing scoring functions such as TRANSE and DISTMULT (Guu et al., 2015) for knowledge graph triples. However, it is desirable to be able to answer queries that are not restricted to a single missing entity. Answering these types of queries, however, is not straightforward. One prior method (Hamilton et al., 2018) proposes a feed forward neural network that receives query embeddings as inputs to perform set intersection in vector space. This approach fails to consider the post-intersection target query while performing the intersection, that is, this approach only considers the queries arising from the source or anchor nodes.

SUMMARY

The present invention provides a method for encoding a query graph into a sequence representation, the query graph having a plurality of nodes including m root nodes and n leaf nodes, wherein m and n are integer values. The method includes the steps, implemented in a processor, of receiving a set of m×n path queries representing a query graph, each of the m×n path queries beginning with a root node and ending with a leaf node; and encoding positions of each node and each edge between nodes within each of the m×n path queries independently, wherein the encoded positions include a positional order within each path query. The invention can be used for, but is not limited to, medical uses, such as for predicting protein-drug interactions or medical conditions, as well as other applications.

BRIEF DESCRIPTION OF THE DRAWINGS

Embodiments of the present invention will be described in even greater detail below based on the exemplary figures. The invention is not limited to the exemplary embodiments. All features described and/or illustrated herein can be used alone or combined in different combinations in embodiments of the invention. The features and advantages of various embodiments will become apparent by reading the following detailed description with reference to the attached drawings which illustrate the following:

FIG. 3 illustrates the difference between the workings of the SOTA Graph Query Embedding model (GQE) and an embodiment of the present invention: (BiQE);

DETAILED DESCRIPTION

Figure 1A:
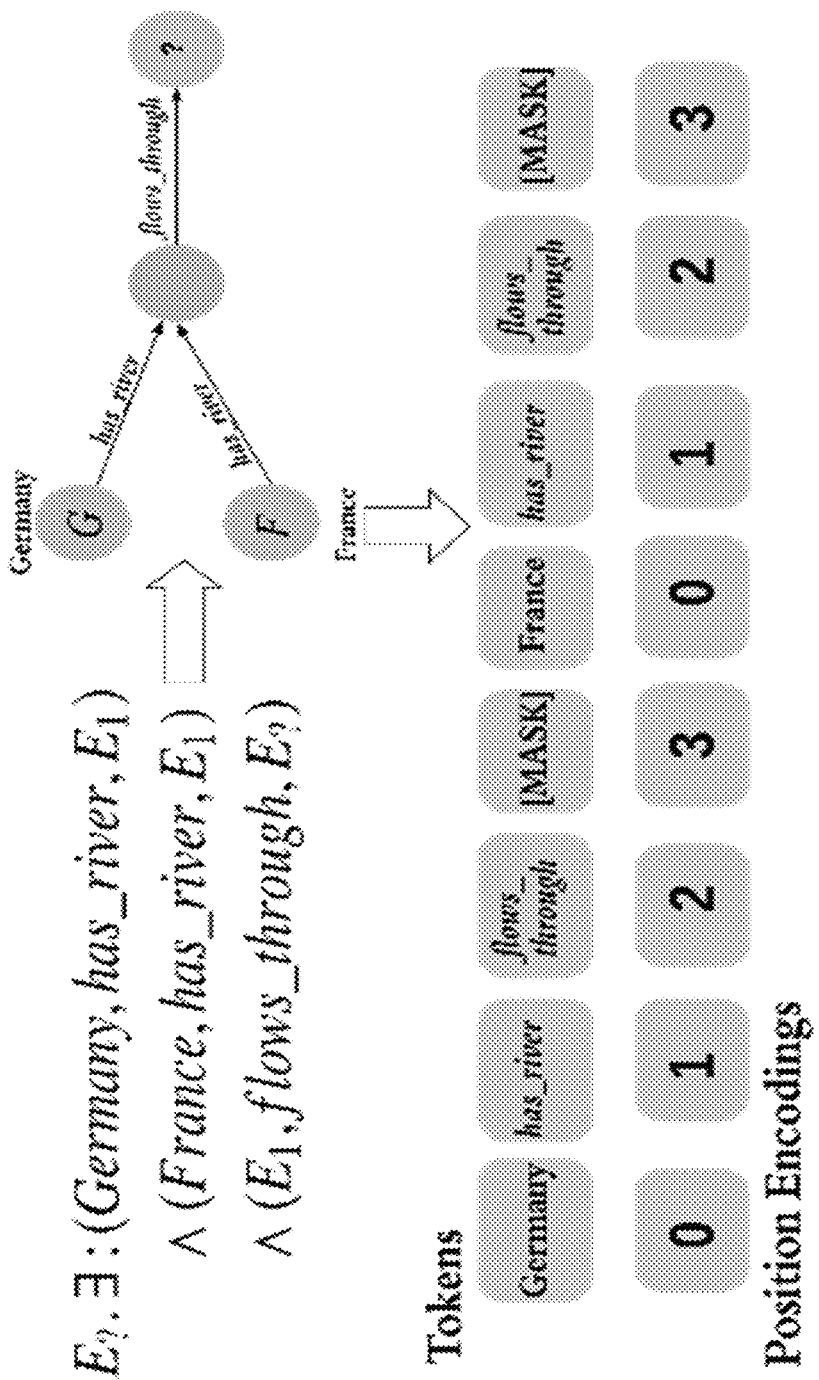
FIG. 1A illustrates a conjunctive query, encoded as a sequence, fed to a transformer model according to an embodiment.

Accordingly, it is desirable to provide improved systems and methods for answering queries and in particular complex, conjunctive queries.

Embodiments of the invention provide systems and methods for answering complex, conjunctive queries, and in particular complex, conjunctive queries missing one or multiple entities.

Embodiments of the invention relate to novel methods and systems to answer complex conjunctive queries in the presence of missing information, e.g., one or multiple missing entities in the query. Additionally the system and method embodiments advantageously transform any graph representation of the conjunctive query into a unique set of sequences, which, in turn, may advantageously be encoded using a trainable self-attention architecture.

Certain embodiments of the invention use bidirectional transformer networks to incorporate the query, e.g., the entire query context. Transformer models are primarily sequence encoding models, that is, they encode a sequence of discrete tokens for sequence or token classification tasks. There is no clear way to feed a query graph to a transformer because sequences contain positional information, while the various parts of a query graph may be permutation invariant. Accordingly, in an embodiment, a novel positional encoding scheme is provided that allows a transformer to answer conjunctive graph queries.

According to an embodiment, a processor-implemented method of encoding a query graph into a sequence representation is provided, wherein the query graph has a plurality of nodes including m root nodes and n leaf nodes, wherein m and n are integer values. The method comprising the steps, implemented in a processor, of receiving a set of m×n path queries representing a query graph, each of the m×n path queries beginning with a root node and ending with a leaf node; and encoding positions of each node and each edge between nodes within each of the m×n path queries independently, wherein the encoded positions include a positional order within each path query. In an embodiment, the encoded positions may have no positional ordering between different path queries.

According to an embodiment, the receiving the set of m×n path queries representing the query graph includes: receiving the query graph, and converting the query graph into a sequential format by decomposing the graph query into the set of m×n path queries.

According to an embodiment, the query graph is a connected directed acyclic graph (DAG).

According to an embodiment, each of the plurality of nodes represents one of an entity on the query graph, an existentially quantified entity variable or a free entity variable, and wherein each edge represents a relation type.

According to an embodiment, the method further includes masking each free variable entity. According to an embodiment, the query graph includes at least two free variable entities.

According to an embodiment, the encoding positions of each node and each edge between nodes within each of the m×n path queries independently includes mapping each of the m×n path queries to a sequence of tokens, and encoding positions of each token within each sequence of tokens.

According to an embodiment, the query graph includes one or more missing entities and the method further includes masking each token representing one of the one or more missing entities to produce a masked sequential query.

According to an embodiment, the method further includes providing the encoded positions to a transformer for answering a conjunctive graph query. According to an embodiment, the top answer, or the top k answers, to the query as determined by the transformer may be provided as output to a user. For example, the output of the transformer may include a softmax function applied over a masked token. The softmax function ranks all the results; for the top k results, the output of the softmax may be sorted in descending order (e.g., the higher the score the better) and the top k results may be returned as output to be viewed by the user.

According to embodiment, the method further includes feeding the masked sequential query to a transformer encoder. In an embodiment, the transformer encoder is trained at the location of each of the masked tokens in the masked sequential query using a categorical cross-entropy loss.

According to an embodiment, two or more of the masked tokens represent the same entity, and the method further includes averaging output probability distributions of the two or more masked tokens.

According to an embodiment, a system for encoding a query graph is provided, wherein the query graph has a plurality of nodes including m root nodes and n leaf nodes, wherein m and n are integer values. The system includes one or more processors which, alone or in combination, are configured to provide for execution of a method including receiving a set of m×n path queries representing a query graph, each of the m×n path queries beginning with a root node and ending with a leaf node; and encoding positions of each node and each edge between nodes within each of the m×n path queries independently, wherein the encoded positions include a positional order within each path query. In an embodiment, the positional encodings may have no positional ordering between different path queries.

According to an embodiment, the receiving the set of m×n path queries representing the query graph includes receiving the query graph, and converting the query graph into a sequential format by decomposing the graph query into the set of m×n path queries.

According to an embodiment, the query graph includes one or more missing entities and the method further includes masking each token representing the one or more missing entities to produce a masked sequential query.

According to an embodiment, the method further includes feeding the masked sequential query to a transformer encoder, and the transformer encoder is trained at the location of each of the masked tokens in the masked sequential query using a categorical cross-entropy loss.

According to an embodiment, a tangible, non-transitory computer-readable medium is provided that has instructions thereon which, upon being executed by one or more processors, alone or in combination, provide for execution of any method described herein, such as, for example, a method of encoding a query graph into a sequence representation, wherein the query graph has a plurality of nodes including m root nodes and n leaf nodes, wherein m and n are integer values.

Embodiments of the invention address the problem of computing probabilistic answers to conjunctive queries that can be mapped to subgraph matching. Every query may be represented with a graph pattern, which is referred to as the query graph, with some of its entities and relations missing. For instance, the query illustrated in FIG. 1A "What are the cities that are located on rivers that flow through Germany and France, along with those rivers?" is an example of such a conjunctive query.

According to an embodiment, a knowledge graph may be defined as $(KG)\mathcal{G}=(\varepsilon, \mathcal{R}, \mathcal{T})$, which includes a set of entities $\varepsilon$, a set of relation types $\mathcal{R}$, and a set of triples $\mathcal{T}$ of the form $t=(e, r, e') \in \varepsilon \times \mathcal{R} \times \varepsilon$. According to an embodiment, a conjunctive query may be defined as follows:

$$E_1^?, \ldots, E_k^? \exists E_1, \ldots, E_m : c_1 \wedge c_2 \wedge \ldots \wedge c_n,$$

where $c_i, \ell \in \{1, \ldots, n\}$ is one of the following
1. $(e_i, r, E_j^?)$ or $(E_j^?, r, e_i)$;
2. $(e_i, r, E_j)$ or $(E_j, r, e_i)$;
3. $(E_i, r, E_j)$ or $(E_i^?, r, E_j^?)$; or
4. $(E_i, r, E_j^?)$ or $(E_i^?, r, E_j)$.

where $E_1, \ldots, E_k$ are existentially quantified bound variables and $E_1^?, \ldots, E_k^?$ are free variables and $e_i$ is some arbitrary entity. The free variables represent the entities to be predicted. The query graph of a conjunctive query is the graph consisting of the triples in the conjunctive query. The set of conjunctive queries may be constrained to those for which the query graph is a connected directed acyclic graph (DAG). In contrast to prior methods, the present embodiments can have more than one free variable in the query, and the free variables can be at any position in the DAG. A typical query graph is illustrated in FIG. 1A.

Accordingly, embodiments of the invention advantageously address the problem of answering conjunctive queries, such as the above-mentioned query, even when the knowledge graph is not complete, that is, when there may be missing triples. In certain embodiments, the answers of the query are associated with a weight or probability indicating the likelihood of each such answer being correct. These weights or probabilities may be used to rank the answers and provide the top-k answers to the user.

Figure 1B:
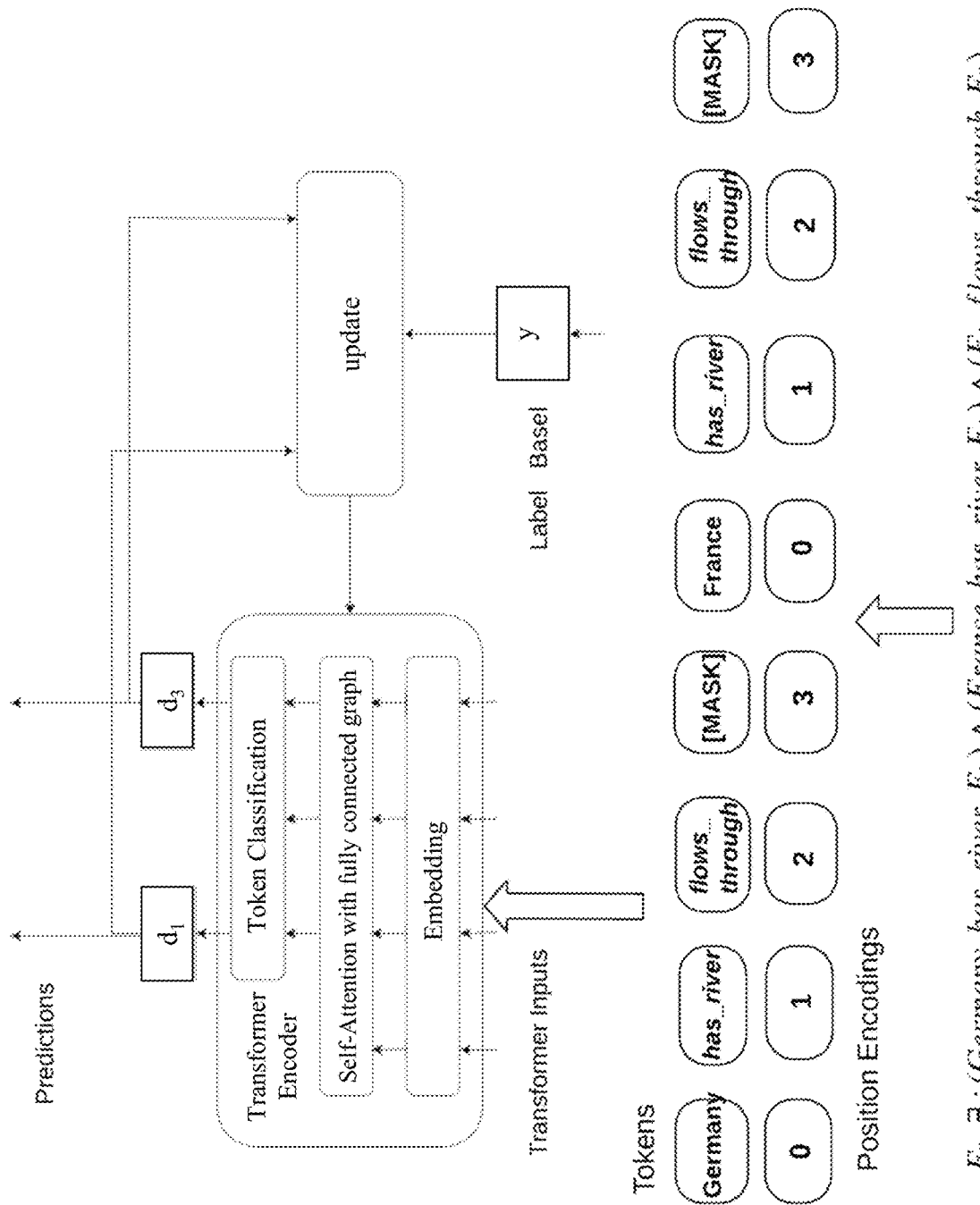
FIG. 1B illustrates a system diagram according to an embodiment.

A model based on a bi-directional transformer encoder is used in certain embodiments to encode a conjunctive graph query. FIG. 1B illustrates a system diagram according to an embodiment. As shown in FIG. 1B, a conjunctive query (from FIG. 1A) is encoded as a sequence and fed to a transformer (transformer encoder). The transformer may include an embedding layer that sums up the tokens and positional embeddings for each token in the sequence. The positional embeddings receive the position of a token in the sequence which ranges from 0 to the maximum sequence length. The embedding layer is followed by one or several encoder layers, each containing a self-attention layer followed by a feed forward layer followed by a normalization layer. The self-attention layer may include a mechanism that acts like a graph neural network and that induces a weighted graph on the input tokens. It is this graph induction mechanism that allows the present embodiments to induce a latent dependency structure in addition to the observed relational structure. The normalization layer may help the model learn faster and the neural network is found to improve performance.

The query DAG corresponding to a conjunctive query under consideration may have multiple nodes representing free variables (e.g., target nodes), bound variables (e.g., quantifier nodes), and entities (e.g., anchor nodes). Because the transformer expects sequential input, the query graph is mapped to a sequence representation in an embodiment. This is done in one embodiment by decomposing the query DAG into a set of unique query paths from each root node to each leaf node of the query DAG. The DAG structure imposes a partial ordering on the nodes. This allows for decomposing the query DAG into a set of path queries that originate from root nodes and end in leaf nodes. A DAG query graph with m root and n leaf nodes is decomposed into mn paths. Because there is an order within each path and there may be no ordering between paths, positional encodings are used in certain embodiments to represent the order of paths, but the position at every path boundary is reset to zero. Because the self-attention layer(s) are position invariant and the positional information lies solely in the position embeddings, the positional encodings of tokens in a branch do not change even if order between the branches are changed. This advantageously allows for feeding the set of path queries to the transformer in any arbitrary order and advantageously allows the model to generalize even when the order of path queries is changed.

A query path may include free variables, existentially quantified variables, constants, and relations. In an embodiment, a query path may be mapped to a sequence of tokens by representing free variables (values to be predicted) with [MASK] tokens and dropping existentially quantified variables. For example, the path query (a conjunctive query whose query graph is a sequence of nodes)

$$E_1^?, E_2^? \cdot \exists E_1, (e, r_1, E_1), (E_1, r_2, E_1^?), (E_1^?, r_3, E_2)$$

may be mapped to the sequence $$e \to r_1 \to r_2 \to [MASK] \to r_3 [MASK]$$

The model may be trained to predict the entity from the set of all entities at the location of the [MASK] tokens, e.g., using a categorical cross-entropy loss. Entity and relations are separate tokens in the form of unique ids. Because query DAGs are decomposed into multiple paths, there may be two or more [MASK] tokens that refer to the same unknown entity. In an embodiment, this is addressed by averaging the output probability distributions of these [MASK] tokens during training as well as during test time.

The method and system embodiments provide several advantages. For example, the present embodiments provide an approach to convert the query graph (the graph-representation of the conjunctive knowledge graph query) into a set of sequences which may be, in turn, encoded in a particular way in a self-attention based machine learning model. By definition of the conjunctive queries, in an embodiment, each query graph is a directed acyclic graph whose nodes represent entities in the KG, existentially quantified entity variables, and/or free entity variables and whose edges represent relation types. The directed acyclic graph (DAG) may be converted into a set of sequences by enumerating all sequences that begin with a root node of the DAG and end in a leaf node of the DAG. These set of sequence are now encoded as a single sequence, e.g., by concatenating the sequences and using additional tokens to encode the position of each entity or relation type within each of these sequences. The token representing the position may be considered as a token representing the natural numbers from 1 to the maximum length of an input sequence. The number represents the position of the token in the sequences. FIG. 1B illustrates a system diagram according to an embodiment of the invention, wherein a conjunctive query is encoded as a sequence and fed to a transformer model.

Given a query DAG encoded into a sequence representation, this representation may be used in an embodiment to train a Transformer neural network (e.g., a neural network with a self-attention layer as a basic building block) in a self-supervised manner.

EXAMPLE USE EMBODIMENTS

1. Biomedical Networks: Embodiments of the invention can be used on biomedical networks which contain information about drugs and proteins. The present embodiments could answer complex queries over this network, such as "get me the drugs that target the same protein and also target a protein from a particular family". This would help biomedical researchers in their research work.

2. Company Knowledge Graphs: Given a company knowledge graph that contains information about various companies, their statistics and actions taken by the company, embodiments of the invention can be used to query this knowledge graph to answer complex queries such as "get me two companies located in the same country who have invested in IT companies". This would be a useful tool for investors and company employees.

3. Activity Suggestions: Given a knowledge graph, e.g. a graph about the unemployment situation of citizens and potential activities that could be assigned to them to increase their ability to find a job, embodiments of the invention could be used to predict for a citizen the most promising activity. This would help case workers at unemployment centers and, of course, the citizen themselves.

Figure 2:
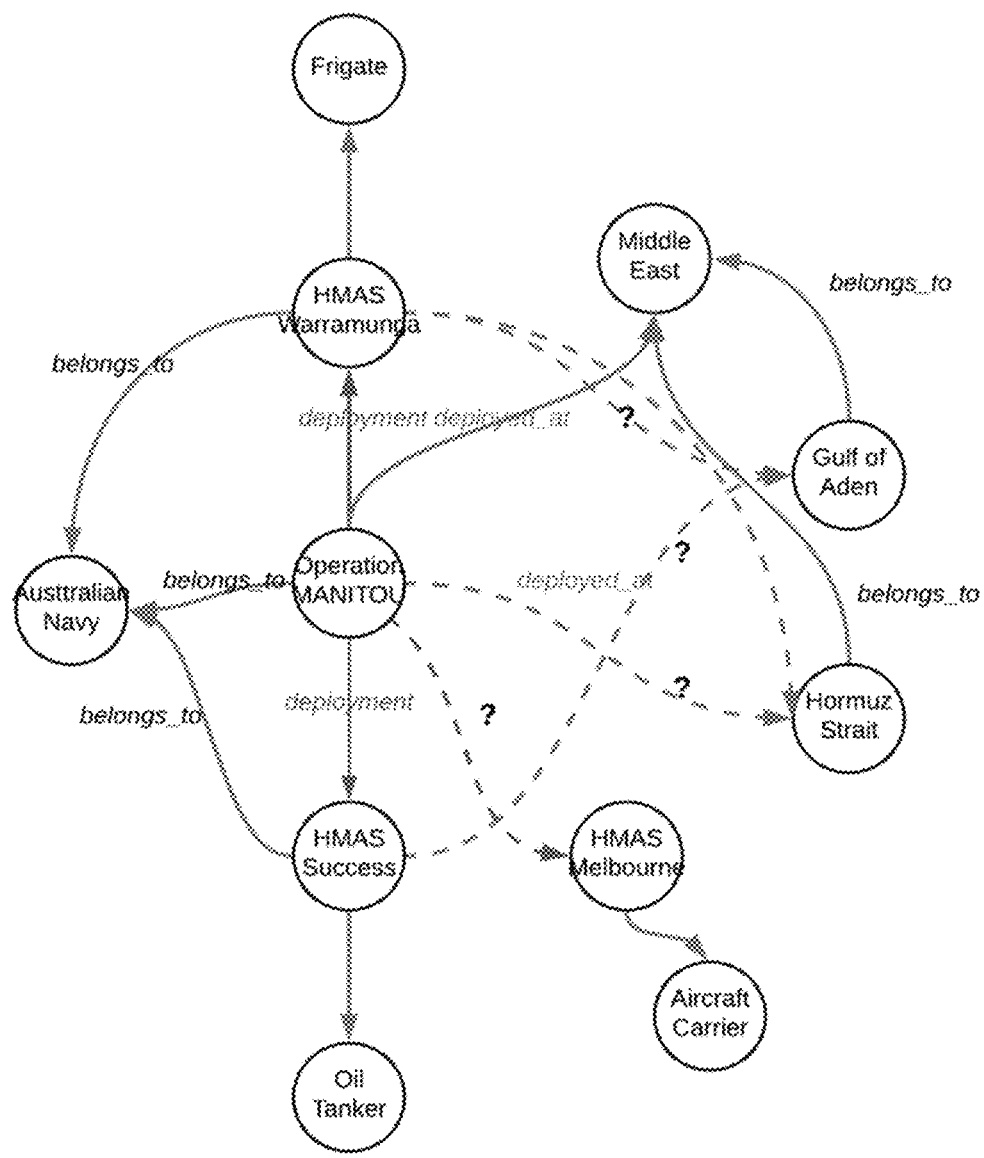
FIG. 2 illustrates an example knowledge graph containing information about naval ships for which an analyst may ask complex queries according to an embodiment.

4. Public Safety Knowledge Graphs: A defense analyst may need to piece together, think about and infer information from various sources for analyzing a current situation, assessing risk, and also planning for the future. For example, consider the knowledge graph shown in FIG. 2 containing information about naval ships. For example, the analyst may ask complex queries such as, "find all ships deployed at locations in Middle East, given that the ships belong to Frigate Class." (Ship:?, deployed_at, location:?; location:?, located_in, Middle East; Ship:?, is_type_of, Frigate Class). With the present embodiments, an analyst would be able to piece together disparate pieces of information for querying about people, locations, assets of interest, etc.

Embodiments of the invention are advantageously able to handle various types of queries. For example, embodiments can handle queries with multiple missing entities. Previous methods had to decompose such a query in several subqueries. As a result the present embodiments exhibit superior performance on such queries due to the ability to model the entire query in a joint manner. The present embodiments can also handle complex queries, such as DAG queries. Empirically, the present embodiments exhibit superior performance on such queries compared to previous methods.

The various embodiments significantly improve performance over the state-of-the-art, as evidenced by the experimental results, using the Bio dataset and the FB15K-237 dataset, shown in Table 1 and 2 shown in FIG. 3. The Bio dataset consists of seven types of conjunctive queries. Three out of the seven types are path queries (one, two and three hop) and the rest are DAG queries. However this dataset only considers queries that predict only one target, i.e., they are concerned with only one free variable. A new path query dataset that includes paths with multiple missing entities was created from the popularly used benchmark Freebase FB15K-237 dataset. Paths were sampled by performing one random walk per node with depth chosen uniformly at random. The maximum depth is limited to six. Randomized train, development and test splits were made from the obtained walks ensuring that no triples from the test occur in the development and train set, and no triple from development appear in training set. A zero-shot path learning setting was not considered, therefore a sequence of relations in test can occur in train, but with different entities.

For the FB15K-237 path dataset, entity prediction was evaluated using two ranking metrics, namely Mean Reciprocal Rank (MRR) and HITS@10. Each missing intermediate entity and the final target is ranked against the entire entity set filtering the positive entities. For the Bio dataset the same metrics, i.e., Area Under the Curve (AUC) and Average Percentile Rank (APR), were used. Evaluation against hard negatives for DAG queries was also used.

The GQE model was re-implemented for answering path queries with multiple missing entities on the FB15K-237 dataset. The L2 regularizer and the Adam optimizer step size were tuned for this implementation of GQE model on paths, while keeping the embedding dimension fixed at 100. Random negative sampling with 100 negative samples were fed to a softmax function that predicts missing entities.

For the FB15K-237 path dataset BIQE was trained by randomly masking intermediate entities in paths found in the training data. This allows the model to see several combinations of masked and unmasked entities. Further augmentation of the training data was done by adding single hop triples obtained by decomposing paths in the training set. For fair comparison, these triples were added to the training set while learning GQE on FB15K-237. For BIQE the transformer encoder configuration was used. For the Bio dataset BIQE was trained by predicting the target missing entity. The training, development and test data publicly released in the GQE paper.

The results of experiments on the FB15K-237 path dataset based on the position of the missing intermediate entity are broken down in Table 1 (FIG. 3); the GQE model with different triple embedding functions is compared against BIQE. BIQE significantly outperforms the baseline models. For some models, queries with larger hops perform better than 1-hop queries. This due to the lack of intermediate entities to constrain the answer set, resulting in a bigger set of correct targets for 7-hop queries compared to 1-hop ones.

Figure 4:
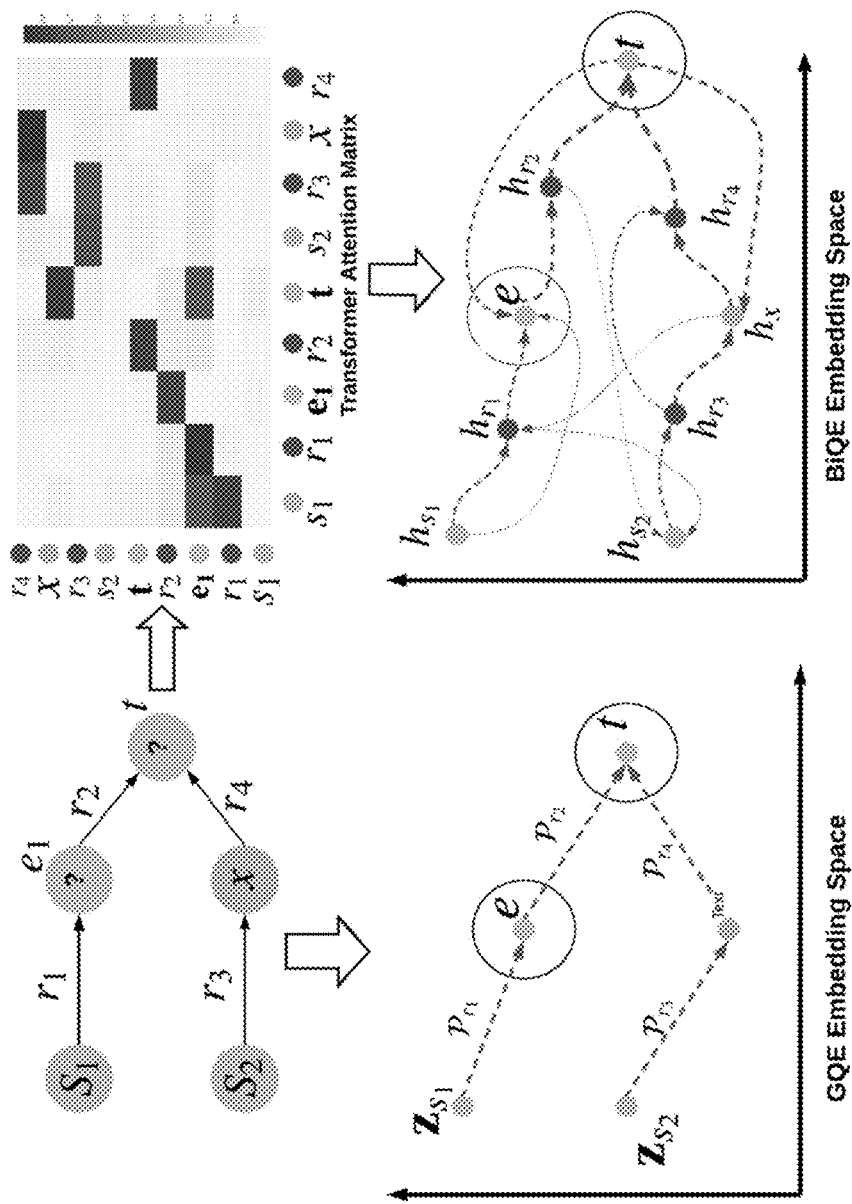
FIG. 4 illustrates Query Embedding in previous state of the art GQE vs BiQE.

Just like the FB15K-237 paths dataset, a significant improvement is seen for the Bio dataset which also contains DAG queries. As illustrated in Table 2 (FIG. 3), BIQE improves AUC performance over GQE by almost 6 percentage points. The self-attention mechanism is likely the key factor behind this improvement. As illustrated in FIG. 4 the prior GQE model answers queries by traversing the query graph in embedding space in the direction of the source to the targets. However it may be possible to arrive at the missing entities starting at different parts of the query. In contrast, the self-attention mechanism allows the present embodiments (BIQE) to reach missing targets from any arbitrary path or element in the query in the embedding space. The attention matrix and its effect in embedding space illustrates this mechanism.

Hereinafter, two possible exploitations in accordance with embodiments of the present invention will be described:

1. Link Prediction

All projects that currently employ KBLRN would benefit by replacing the current latent expert, DistMult, with the present embodiments. As can be seen by the experimental results shown above, using the present embodiments leads to major improvements over DistMult. The drastic improvement in results are displayed in Table 1.

Example Projects where this can be Applied May Include:

a. KMD: Improving the Job Search Process

KMD is working on a project to improve the process for unemployed citizens in Denmark, so that they find a new job more efficiently. While unemployed, citizens are currently signed up to various activities that are intended to increase their chance of finding a new job. This is currently done by human workers. However, human workers can only assign activities that they think are best based on their limited and biased experience. A machine learning algorithm could leverage data from across the entire country and predict for each citizen the activity that will have the largest increase in probability of that citizen then finding a job. This can be cast as a link prediction problem and the present embodiments can be applied as the latent expert inside KBlrn.

b. BIU: EHR Cardiovascular Prevention NES

Given a blood sample of a patient, their personal protein markers are extracted. Based on this, the goal is to predict if the patient will suffer from a cardiovascular event in the near future. This can be cast as a link prediction problem and the present embodiments can be applied as the latent expert inside KBlrn. It could also later be used to detect other events. For example it could also be used in the BIU diabetes prevention use case.

c. Fraud Detection

KBlrn was very successful in the fraud detection project. Using the present embodiments in a future project would further boost results.

2. Complex Queries

A limitation of previous methods is that only queries with one missing entity can be answered. However, with the present embodiments, it is advantageously now possible to answer more complex queries, where more than one entity may be missing and where the model is required to reason over several existential variables. Being able to answer such complex queries advantageously opens up a new field of possible projects, including for example:

i) complex drug-drug or drug-protein interactions, where for example questions of the following type could be answered: Return all pairs of drugs (a, b) and a protein p1 such that there exists some protein p such that a targets p, b targets p1 and p1 interacts in some way with p.

ii) inference with complex queries in public safety. For example a police officer investigating drug smuggling may query: Return all locations such that location is located_in city A, and located_near B, and visited_by person C in the month of July 2018.

Embodiments of the invention can advantageously handle queries having multiple missing entities. Previous methods would have to decompose one query into several subqueries. In most cases this leads to inferior results. Splitting such a query into a series of subqueries leads to inferior performance. Furthermore, even in the instance of only one missing entity, the present embodiments exhibit superior performance over other methods.

The method embodiments herein advantageously map the query graphs into a representation that can be used in conjunction with self-attention based neural architectures (such as the Transformer). Self-supervised training of the self-attention based neural architecture may be performed by masking particular nodes in the query DAG and combining the probability distributions of two (or more) mask tokens, e.g., when known that they are representing the same entity.

According to embodiments, a dataset of interest is obtained and processed. The data could be in the form of a knowledge graph from which graph queries can be extracted, e.g., via random walks. Alternatively, the data could already be in the form of a series of graph queries from a knowledge graph. The graph queries are then converted into a sequential format. Missing entities of interest in the sequential query may be masked, e.g. the original token may be replaced by [MASK]. The masked sequential query may be fed to a transformer encoder, for example a transformer encoder trained at the location of the [MASK] tokens using a categorical cross-entropy loss. If it is known that two or more [MASK] tokens refer to the same entity, the output probability distributions of these [MASK] tokens may be averaged during training as well as during test time. The best training iteration on held-out data may be selected. The chosen model may be applied to new instances.

Figure 5:
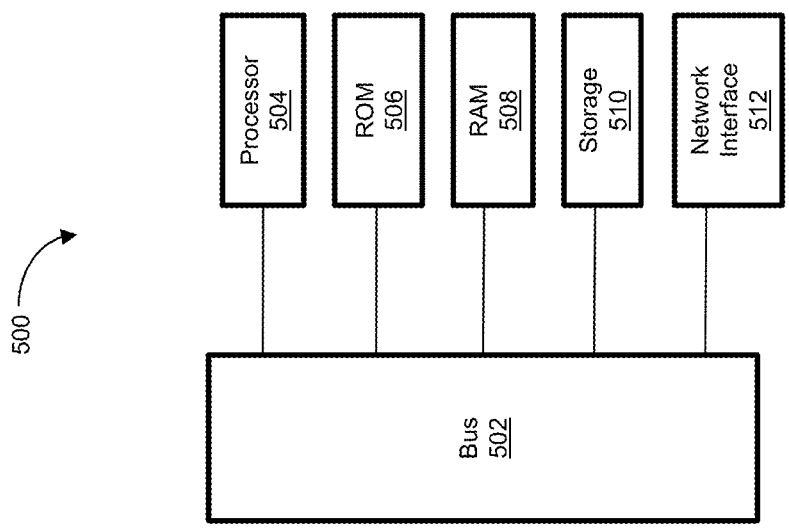
FIG. 5 is a block diagram of a processing system according to an embodiment.

FIG. 5 is a block diagram of a processing system according to an embodiment. The processing system 500 can be used to implement the protocols, devices, mechanisms, systems and methods described above. The processing system 500 includes a processor 504, such as a central processing unit (CPU) of a computing device or a distributed processor system. The processor 504 executes processor-executable instructions for performing the functions and methods described above. In embodiments, the processor executable instructions are locally stored or remotely stored and accessed from a non-transitory computer readable medium, such as storage 510, which may be a hard drive, cloud storage, flash drive, etc. Read Only Memory (ROM) 506 includes processor-executable instructions for initializing the processor 504, while the random-access memory (RAM) 508 is the main memory for loading and processing instructions executed by the processor 504. The network interface 512 may connect to a wired network or cellular network and to a local area network or wide area network, such as the Internet, and may be used to receive and/or transmit data, including datasets such as datasets representing one or more images. In certain embodiments, multiple processors perform the functions of processor 504.

While embodiments have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-implemented method of encoding a query graph, the query graph having a plurality of elements including m root nodes and n leaf nodes, and one or more missing nodes or one or more missing edges or both one or more missing nodes and one or more missing edges, wherein m and n are integer values, the method comprising the steps, implemented in a processor, of:

receiving a set of m×n path queries representing the query graph, wherein each of the m×n path queries begins with a root node and ends with a leaf node;

converting the query graph into a set of sequences corresponding to the set of m×n path queries, wherein each sequence in the set of sequences represents one of the path queries in the set of m×n path queries, wherein each element represents one of an entity on the query graph, an existentially quantified entity variable or a free entity variable, each free entity variable representing one of the one or more missing nodes or one or more missing edges;

encoding the set of sequences as a single sequential query, wherein positions of each element within each of the m×n path queries are encoded independently, wherein the encoded positions include a positional order within each of the m×n path queries, and wherein the encoded positions include positional counter values that are reset at a start position of each path of the m×n path queries in the single sequential query;

masking each free entity variable to produce a masked sequential query; and feeding the masked sequential query to a transformer encoder.

2. The method of claim 1, wherein the receiving the set of m×n path queries representing the query graph includes: receiving the query graph, and converting the query graph into a sequential format by decomposing the graph query into the set of m×n path queries, and wherein the query graph is a directed acyclic graph.

3. The method of claim 1, wherein two or more of the masked free entity variables represent the same node or edge, and wherein the method further includes averaging output probability distributions of the two or more masked free entity variables.

4. The method of claim 1, wherein the query graph includes at least two free entity variables.

5. The method of claim 1, wherein the encoding positions of each element within each of the m×n path queries independently includes mapping each of the mx n path queries to a sequence of tokens, and encoding positions of each token within each sequence of tokens.

6. The method of claim 1, wherein the feeding the masked sequential query to the transformer encoder includes feeding the masked sequential query to the transformer encoder, wherein the transformer encoder is trained at the location of each of the masked free entity variables in the masked sequential query using a categorical cross-entropy loss.

7. The method of claim 1, wherein the method is applied to a medical dataset, and wherein the query graph is a medical knowledge graph representing the medical dataset.

8. The method of claim 7, wherein the query graph represents a plurality of drug-drug interactions and/or drug-protein interactions, and wherein at least one free entity variable represents a drug-protein interaction or a protein-protein interaction.

9. The method of claim 7, wherein the method is used to predict links between protein markers of a patient and a likelihood of the patient suffering from a medical issue including at least one of a cardiovascular event or diabetes.

10. A computer system for encoding a query graph, the query graph having a plurality of elements including m root nodes and n leaf nodes, and one or more missing nodes or one or more missing edges or both one or more missing nodes and one or more missing edges, wherein m and n are integer values, the system comprising one or more processors which, alone or in combination, are configured to provide for execution of a method comprising:
  receiving a set of mx n path queries representing the query graph, wherein each of the m×n path queries begins with a root node and ends with a leaf node;
  converting the query graph into a set of sequences corresponding to the set of m×n path queries, wherein each sequence in the set of sequences represents one of the path queries in the set of m×n path queries, wherein each element represents one of an entity on the query graph, an existentially quantified entity variable or a free entity variable, each free entity variable representing one of the one or more missing nodes or one or more missing edges;
  encoding the set of sequences as a sequential query, wherein positions of each element within each of the m×n path queries are encoded independently, wherein the encoded positions include a positional order within each of the mx n path queries, and wherein the encoded positions include positional counter values that are reset at a start position of each path of the m×n path queries in the sequential query;
  masking each free entity variable to produce a masked sequential query; and
  feeding the masked sequential query to a transformer encoder.

11. The system of claim 10, wherein the receiving the set of m×n path queries representing the query graph includes receiving the query graph, and converting the query graph into a sequential format by decomposing the graph query into the set of m×n path queries, and wherein the query graph is a directed acyclic graph.

12. The system of claim 10, wherein the query graph includes at least two free entity variables.

13. The system of claim 10, wherein the feeding the masked sequential query to the transformer encoder includes feeding the masked sequential query to the transformer encoder, wherein the transformer encoder is trained at the location of each of the masked free entity variables in the masked sequential query using a categorical cross-entropy loss.

14. The system of claim 10, wherein the method is applied to a medical dataset, and wherein the query graph is a medical knowledge graph representing the medical dataset.

15. The system of claim 14, wherein the query graph represents a plurality of drug-drug interactions and/or drug-protein interactions, and wherein at least one free entity variable represents a drug-protein interaction or a protein-protein interaction.

16. The system of claim 14, wherein the method is used to predict links between protein markers of a patient and a likelihood of the patient suffering from a medical issue including at least one of a cardiovascular event or diabetes.

17. A tangible, non-transitory computer-readable medium having instructions thereon which, upon being executed by one or more processors, alone or in combination, provide for execution of a method of encoding a query graph into a sequence representation, the query graph having a plurality of elements including m root nodes and n leaf nodes, and one or more missing nodes or one or more missing edges or both one or more missing nodes and one or more missing edges, wherein m and n are integer values, the method comprising the steps of:
  receiving a set of m×n path queries representing the query graph, wherein each of the m×n path queries begins with a root node and ends with a leaf node;
  converting the query graph into a set of sequences corresponding to the set of m×n path queries, wherein each sequence in the set of sequences represents one of the path queries in the set of m×n path queries, wherein each element represents one of an entity on the query graph, an existentially quantified entity variable or a free entity variable, each free entity variable representing one of the one or more missing nodes or one or more missing edges;
  encoding the set of sequences as a single sequential query, wherein positions of each element within each of the mx n path queries are encoded independently, wherein the encoded positions include a positional order within each of the m×n path queries, and wherein the encoded positions include positional counter values that are reset at a start position of each path of the mx n path queries in the single sequential query;
  masking each free entity variable to produce a masked sequential query; and
  feeding the masked sequential query to a transformer encoder.

18. The tangible, non-transitory computer-readable medium of claim 17, wherein the method is applied to a medical dataset, and wherein the query graph is a medical knowledge graph representing the medical dataset, and/or wherein the query graph is converted into a set of sequences encoded in a self-attention-based machine-learning model.

19. The tangible, non-transitory computer-readable medium of claim 18, wherein the query graph represents a plurality of drug-drug interactions and/or drug-protein interactions, and wherein at least one free entity variable represents a drug-protein interaction or a protein-protein interaction.

20. The tangible, non-transitory computer-readable medium of claim 18, wherein the method is used to predict links between protein markers of a patient and a likelihood of the patient suffering from a medical issue including at least one of a cardiovascular event or diabetes.

* * * * *